United States Patent [19]

Fischer

[11] Patent Number: 5,794,970

[45] Date of Patent: Aug. 18, 1998

[54] GAS BAG MODULE

[75] Inventor: Anton Fischer, Heuchlingen, Germany

[73] Assignee: TRW Occupant Restraint Systems GmbH, Alfdorf, Germany

[21] Appl. No.: 855,137

[22] Filed: May 13, 1997

[30] Foreign Application Priority Data

May 15, 1996 [DE] Germany ............ 296 08 809 U

[51] Int. Cl.[6] ............................................. B60R 21/16
[52] U.S. Cl. ................... 280/731; 280/728.3; 200/61.54
[58] Field of Search ....................... 280/731, 728.3; 200/61.54

[56] References Cited

U.S. PATENT DOCUMENTS

| 5,398,962 | 3/1995 | Kropp | 280/731 |
|---|---|---|---|
| 5,465,998 | 11/1995 | Davis | 280/731 |
| 5,499,841 | 3/1996 | Trojan et al. | 280/731 |
| 5,577,767 | 11/1996 | Nemoto | 280/731 |
| 5,585,606 | 12/1996 | Ricks | 200/61.08 |
| 5,590,902 | 1/1997 | Eckhout | 280/728.3 |
| 5,716,068 | 2/1998 | Sahara et al. | 280/731 |

FOREIGN PATENT DOCUMENTS 4410041  9/1994  Germany.

*Primary Examiner*—Christopher P. Ellis
*Attorney, Agent, or Firm*—Tarolli, Sundheim, Covell, Tummino & Szabo

[57] ABSTRACT

A gas bag module for a vehicle steering wheel is provided, which comprises a gas bag, a gas bag cover and a switching foil located in the gas bag cover. The switching foil is mounted in the gas bag cover in such a way that it is detachable and replaceable without the gas bag cover having to be dismantled.

7 Claims, 2 Drawing Sheets

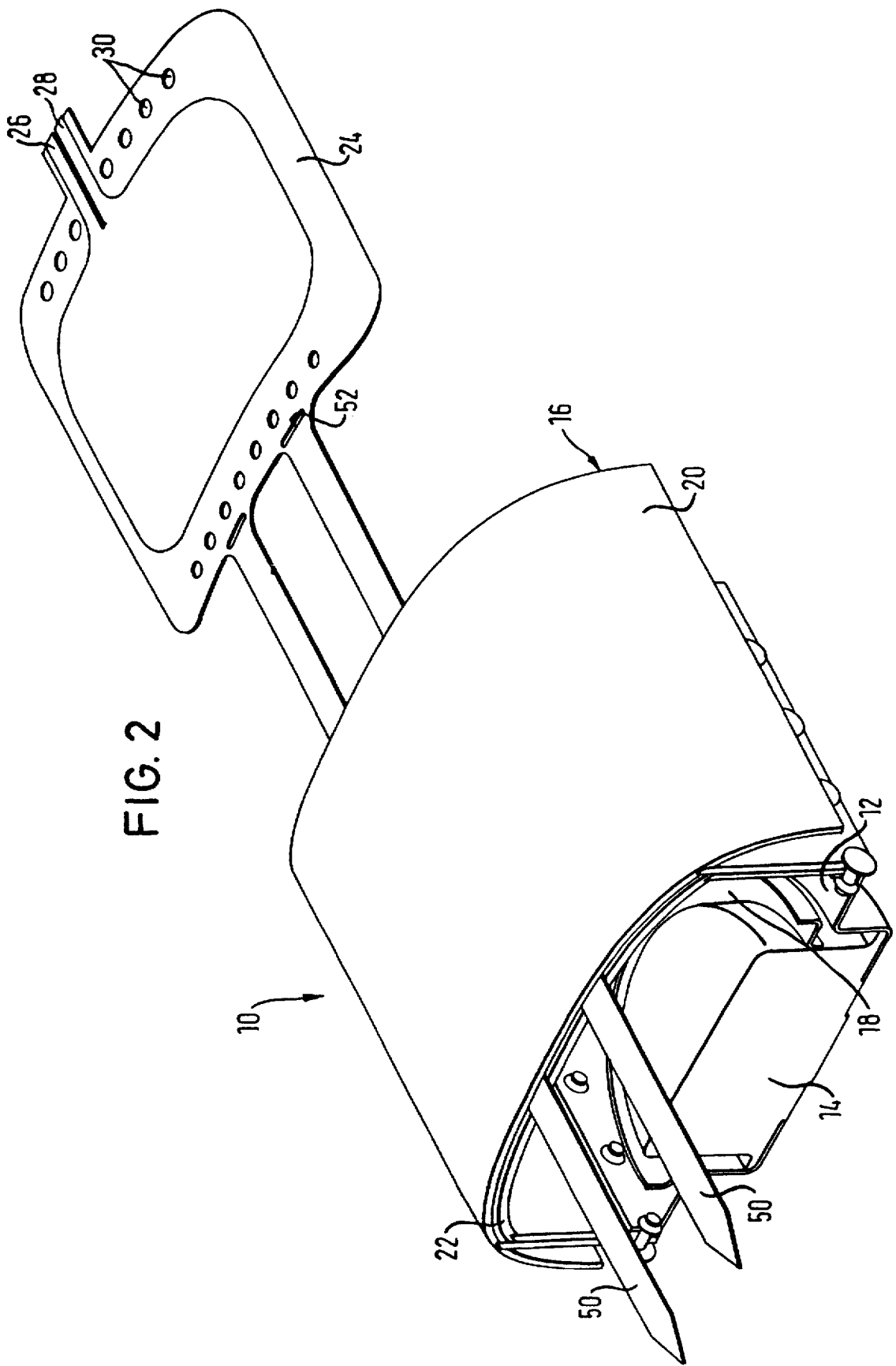

GAS BAG MODULE

Field of the Invention

The invention relates to a gas bag module for a vehicle steering wheel.

BACKGROUND OF THE INVENTION

A conventional gas bag module for a vehicle steering wheel comprises a gas bag, a gas bag cover and a switching foil located in the gas bag cover. The switching foil, which can be used in particular to actuate the horn, is usually moulded into the gas bag cover. Whenever the replacement of the switching foil is necessary, either the entire gas bag module has to be replaced, leading to disproportionately high costs, or the gas bag cover must be replaced together with the switching foil. However, if this replacement is not carried out correctly, it is possible that the proper functioning of the entire gas bag module could be subsequently impaired.

BRIEF DESCRIPTION OF THE INVENTION

The invention creates a gas bag module in which the switching foil can be replaced at any time without causing high costs and without parts which are essential for the correct functioning of the gas bag module having to be dismantled. For this purpose it is provided a gas bag module for a vehicle steering wheel which comprises a gas bag, a gas bag cover and a switching foil located in the gas bag cover. The switching foil is mounted in the gas bag cover in such a way that it is detachable and replaceable without the gas bag cover having to be dismantled.

It is preferably provided that the cover comprises an external part facing the exterior and an internal part located between the external part and the gas bag. The switching foil is located between the external part and the internal part, the switching foil being attached to the gas bag module in such a way that it is accessible from the exterior.

For the switching foil utilized in such a gas bag module according to the invention, it is preferably provided at least one mounting bracket which can be separated from the switching foil. This mounting bracket allows easy mounting of the switching foil.

BRIEF DESCRIPTION OF THE DRAWINGS

The invention is described in the following, reference being made to two embodiments illustrated in the drawing. In these FIG. 2 shows a gas bag module in accordance with a second embodiment of the invention.

DETAILED DESCRIPTION OF THE INVENTION

Figure 1:
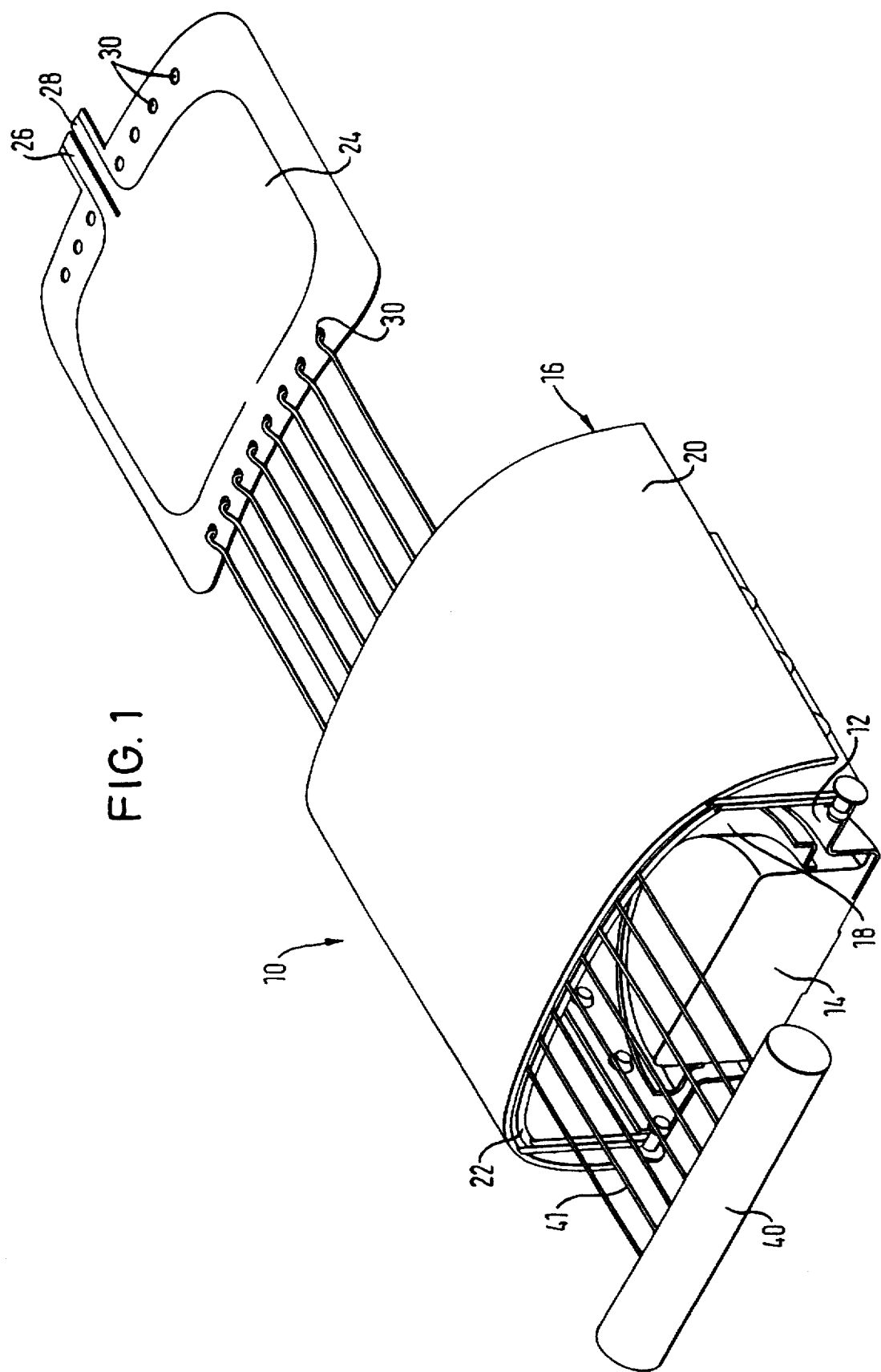
FIG. 1 shows a gas bag module in accordance with a first embodiment of the invention.

FIG. 1 shows a gas bag module 10 in accordance with a first embodiment of the invention. This gas bag module 10 is intended for installation in a vehicle steering wheel (not illustrated) and has a frame 12, a schematically represented gas generator 14 and a gas bag cover 16. In the interior 18 between the frame 12 and the gas bag cover 16 there is a gas bag (not illustrated) which in case of need is inflated by means of the gas generator 14.

The gas bag cover 16 consists of an external part 20 facing the exterior of the gas bag module 10 and an internal part 22 located between this external part 20 and the interior 18 of the gas bag module. Both the external part 20 and the internal part 22 are connected to the frame 12.

A switching foil 24, which is intended for the actuation of a horn, for example, can be inserted into the space between the external part 20 and the internal part 22. The switching foil 24 is provided with two terminals 26, 28, across which an electrical contact can be made to actuate a horn. On two opposite long sides, the switching foil 24 is fitted with configurations by means of which the switching foil 24 can be laterally attached to the gas bag cover 16. In the illustrated embodiment, these configurations are mounting apertures 30 in which appropriate mounting parts of the gas bag cover 16 can engage. For inserting the switching foil 24 in the gas bag cover 16, for example if a defective switching foil is to be replaced by a new one, an installation tool 40 with a thrust resistant section 41 is pushed from one side of the gas bag cover 16 through the space between the external part 20 and the internal part 22 until it emerges again on the other side of the gas bag cover 16. The thrust resistant section 41 is then attached preferably to the mounting apertures 30 in the switching foil 24, and the switching foil 24 can be drawn into the gas bag cover 16 by pulling the installation tool 40 out of the gas bag cover 16. At the end of this operation the tool 40 is detached from the switching foil 24, and the switching foil 24 is secured in the gas bag cover 16 by means of the mounting apertures 30.

FIG. 2 shows a gas bag module in accordance with a second embodiment of the invention. For components in this embodiment that correspond to components familiar from FIG. 1, the same reference symbols are used, and the corresponding descriptions from FIG. 1 are referred to.

In the gas bag module in accordance with the second embodiment of the invention, the switching foil 24 is fitted with two mounting brackets 50 which are attached to the switching foil 24 through a breaking point 52. These mounting brackets 50 can be pushed through the gas bag cover 16 between the external part 20 and the internal part 22 until they emerge on the other side of the gas bag cover 16. The switching foil 24 is then drawn into the gas bag cover 16 by means of these mounting brackets 50 until it can be secured in the gas bag cover 16 by its mounting apertures 30. The mounting brackets 50 are finally separated from the switching foil 24 by tearing or cutting them off.

This invention provides a gas bag module in which the switching foil 24 located in the gas bag cover 16 can be replaced particularly easily, without parts which are essential for the correct functioning of the gas bag module having to be dismantled and without the entire gas bag module having to be replaced.

I claim:

1. A gas bag module for a vehicle steering wheel, comprising a gas bag, a gas bag cover and a switching foil located in said gas bag cover, said switching foil being mounted in said gas bag cover in such a way that it is detachable and replaceable without said gas bag cover having to be dismantled.

2. The gas bag module of claim 1, wherein said cover comprises an external part facing the exterior of said gas bag module, and an internal part located between said external part and said gas bag, said switching foil being located between said external part and said internal part, said switching foil being attached to said gas bag module in such a way that it is accessible from the exterior.

3. The gas bag module of claim 2, wherein said switching foil is laterally attached to said cover.

4. The gas bag module of claim 1, wherein said switching foil is provided with configurations adapted for engagement of an installation tool.

5. The gas bag module of claim 4, wherein said configurations for engagement of an installation tool at the same time serve to attach said switching foil to said cover.

6. A switching foil for the gas bag module of claim 1, comprising at least one mounting bracket which can be separated from said switching foil.

7. The switching foil of claim 6, wherein said mounting bracket is connected with said switching foil by means of a breaking point.

* * * * *